(12) United States Patent
Vandyke et al.

(10) Patent No.: US 11,378,216 B2
(45) Date of Patent: Jul. 5, 2022

(54) CAP HAVING A LOW COST CONSTRUCTION AND A SELF RETAINING FEATURE

(71) Applicant: The Boeing Company, Chicago, IL (US)

(72) Inventors: Bryce A. Vandyke, Snohomish, WA (US); Douglas D. Maben, Snohomish, WA (US); Luis J. Sanchez, Lynnwood, WA (US); Timothy Chiu, Torrance, CA (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 16/599,419

(22) Filed: Oct. 11, 2019

(65) Prior Publication Data

US 2021/0108753 A1 Apr. 15, 2021

(51) Int. Cl.
*F16L 57/00* (2006.01)
*F16L 55/115* (2006.01)
*B65D 59/06* (2006.01)

(52) U.S. Cl.
CPC .......... *F16L 55/115* (2013.01); *F16L 57/005* (2013.01); *B65D 59/06* (2013.01)

(58) Field of Classification Search
CPC ........ F16L 55/115; F16L 57/005; B65D 59/06
USPC ......................................... 138/96 R, 96 T, 89
See application file for complete search history.

(56) References Cited

U.S. PATENT DOCUMENTS

| | | | | |
|---|---|---|---|---|
| 1,885,375 A * | 11/1932 | Ponce | .................... | B65D 59/06 138/96 T |
| 1,931,703 A * | 10/1933 | McCrery | ................ | B65D 59/06 138/96 T |
| 2,092,535 A * | 9/1937 | Schnorr | ................ | F16L 57/005 138/96 T |
| 2,134,730 A * | 11/1938 | Osborn | ................... | B65D 59/06 138/96 T |
| 2,195,530 A * | 4/1940 | Curtis | .................... | F16L 57/005 138/96 T |
| 2,379,529 A * | 7/1945 | Kennedy | ................. | F16N 21/06 184/105.3 |
| 2,599,472 A * | 6/1952 | Miller | ..................... | F16N 21/06 184/105.3 |
| 5,908,048 A * | 6/1999 | Van Driel | ............. | A61M 39/20 138/89 |
| 5,957,316 A * | 9/1999 | Hidding | ............... | B67D 3/0032 215/265 |
| 6,502,604 B1 * | 1/2003 | Lewis | ................... | F16L 55/115 138/89 |

(Continued)

*Primary Examiner* — James F Hook
(74) *Attorney, Agent, or Firm* — Quinn IP Law

(57) ABSTRACT

A cap for closing an open end of a duct tube has a cylindrical side wall having a length between a closed end and an open end of the side wall. An end wall extends across the closed end of the side wall. A conical section of the side wall extends outwardly from the open end of the side wall and has an interior surface configured to guide an end of a duct tube into a hollow interior volume of the side wall. A groove in an interior surface of the side wall is configured to receive a bead around an end of a duct tube inserted through the conical section and into the hollow interior of the side wall. A plurality of pull tabs extend outwardly from the conical section and are configured to be manually pulled, pulling the cap over the end of the duct tube.

19 Claims, 4 Drawing Sheets

(56) References Cited

U.S. PATENT DOCUMENTS

2010/0200102 A1* 8/2010 Zeyfang ................ B65D 59/06
138/96 R

* cited by examiner

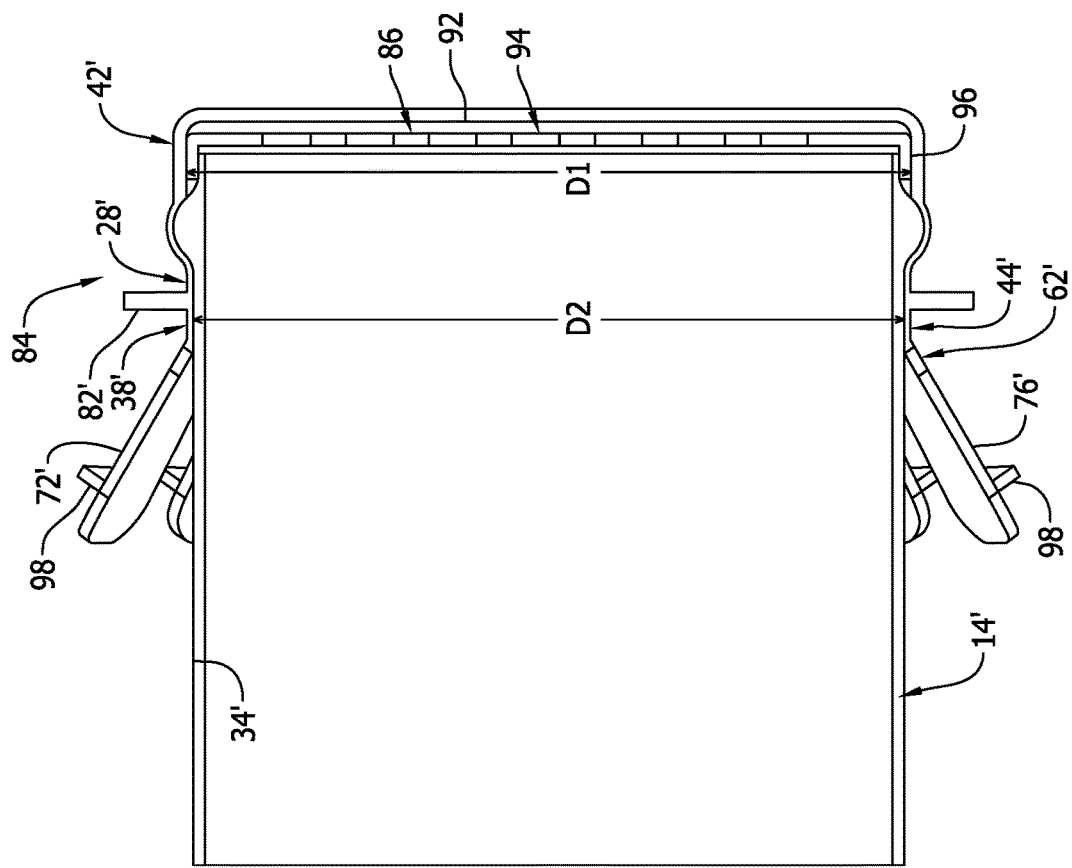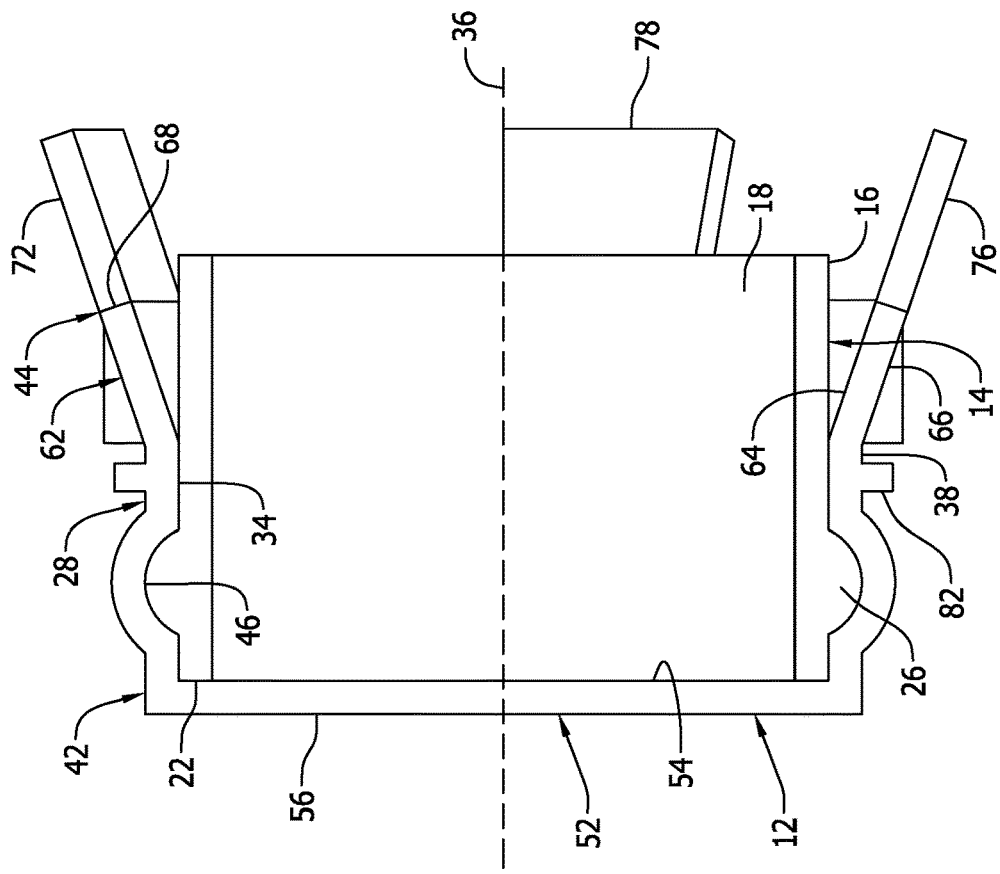

CAP HAVING A LOW COST CONSTRUCTION AND A SELF RETAINING FEATURE

FIELD

This disclosure pertains to a cap that is manually attachable to an end of a duct tube. More specifically, this disclosure pertains to a cap that is manually attachable to an open end of a duct tube of an aircraft environmental control system.

BACKGROUND

In the construction of commercial aircraft, many of the systems that go into the construction of the aircraft are used in various different aircraft having different configurations. For example, an environmental control system for an aircraft can be used in a variety of different aircraft having a variety of different configurations. In order for an environmental control system to be used in a variety of different aircraft configurations, the environmental control system must be adaptable to the particular aircraft configuration in which it is used. For example, a typical environmental control system will have several duct tubes from which a flow of conditioned air is emitted. Depending on the configuration of the aircraft in which the environmental control system is used, all of the duct tubes of the environmental control system may not be needed. The ends of the duct tubes that are not needed in the configuration of the aircraft in which the environmental control system is employed are closed off by a cap. Depending on the configuration of the aircraft in which the environmental control system is used, the open end of only one duct tube may be closed off by a cap manually positioned on the end of the duct tube, or several open ends of several duct tubes may be closed off by several caps manually positioned on the open ends of the duct tubes.

The current constructions of the caps that are used to close off the open ends of duct tubes that are not needed is expensive. The construction of the typical cap is a two-piece construction including the cap that is manually positioned on the open end of the unneeded duct tube, and an adjustable band that extends around the cap. Once the cap is manually positioned on the open end of the unneeded duct tube, the band is manually tightened around to secure the cap to the end of the duct tube.

The two-piece construction of the typical cap used to close off a duct tube adds to the expense of producing the cap and the band. Additionally, the two-piece construction of the cap and the band that are positioned on an open end of an unneeded duct tube is time consuming to use. The cap must first be manually positioned on the end of the unneeded duct tube, the adjustable band is then manually positioned around the cap, and the band is then manually tightened to secure the cap to the end of the unneeded duct tube. If several duct tubes of the environmental control system are not needed, the time required to manually secure a cap to the end of each unneeded duct tube is multiplied by the number of unneeded duct tubes.

SUMMARY

The cap of this disclosure is a one-piece construction, reducing the cost involved in producing the cap. The one-piece construction of the cap also reduces the time required to manually position the cap on the end of an unneeded duct tube and secure the cap to the end of the unneeded duct tube.

The cap is constructed for closing the open end of a duct tube having a bead around the end of the duct tube. The cap is constructed of a plastic material, but other equivalent types of materials could be used.

The cap has a side wall with a cylindrical configuration. The side wall extends around a hollow interior volume of the side wall and the cap. The side wall has an interior surface. The interior surface also has a cylindrical configuration that extends around the hollow interior volume of the side wall and the cap. The cylindrical configuration of the side wall has a center axis that defines mutually perpendicular axial and radial directions relative to the cap. The side wall has an axial length that extends between an inward end or a closed end of the side wall and an opposite outward end or an open end of the side wall.

A groove is formed in the interior surface of the side wall. The groove has an annular configuration and is configured to receive a bead around an end of the duct tube inserted into the interior volume of the side wall and the cap.

An end wall is connected to the inward end or closed end of the side wall. The end wall has a circular configuration and extends across the cylindrical configuration of the side wall and across the hollow interior volume of the side wall and the cap.

The side wall has a conical section. The conical section of the side wall is at the outward end or at the open end of the side wall and opposite the end wall. The conical section has a conical interior surface that extends outwardly from the interior surface of the side wall. The conical interior surface is configured to guide an end of a duct tube the side wall. The conical interior surface is configured to guide an end of a duct tube into the hollow interior volume of the side wall and the cap as the cap is positioned on the open end of the duct tube.

There is an end surface on the outward end of the side wall or the open end of the side wall. The end surface has an annular configuration that extends around the conical section of the side wall and around the interior volume of the side wall and the cap.

A plurality of pull tabs are spatially arranged around the conical section of the side wall. The plurality of pull tabs project axially and radially outwardly from the conical section of the side wall and from the end surface on the outward end or open end of the side wall. The plurality of pull tabs include a first pull tab and a second pull tab that are positioned on radially opposite sides of the center axis. The plurality of pull tabs are configured to be manually gripped by a user of the cap and pulled when installing the cap on the bead around the open end of a duct tube.

There is a rib on the side wall. The rib has an annular configuration and extends around the side wall on the exterior of the side wall. The rib is positioned axially between the conical section of the side wall and the groove. The rib reinforces the resiliency of the side wall.

The side wall, the end wall, the conical section, the end surface, the plurality of pull tabs and the rib are all integrally formed as a single piece of material. The material is a resilient material, making the side wall resilient. The side wall being resilient enables the cylindrical configuration of the interior surface of the side wall to expand radially outwardly as the bead around the end of the duct tube is moved through the conical section of the side wall and into the interior surface of the side wall. The resiliency of the side wall permits the passage of the bead around the end of the duct tube into the cylindrical configuration of the interior surface of the side wall and into the groove, whereby the groove retains the bead around the end of the duct tube to thereby retain the cap on the duct tube.

In a further example of the cap, the interior surface of the side wall has a first interior diameter dimension adjacent the end wall of the cap. The interior surface of the side wall also has a second interior diameter dimension adjacent the open end. The first interior diameter dimension is larger than the second interior diameter dimension. This enables the cap to be positioned on an open end of a duct tube having an orifice assembly over the open end of the duct tube.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 4 is a representation of a side elevation, cross-section view of the cap.

FIG. 5 is a representation of a side elevation, cross-section view a further example of the cap positioned on an orifice over an open end of a duct tube.

DETAILED DESCRIPTION

Figure 2:
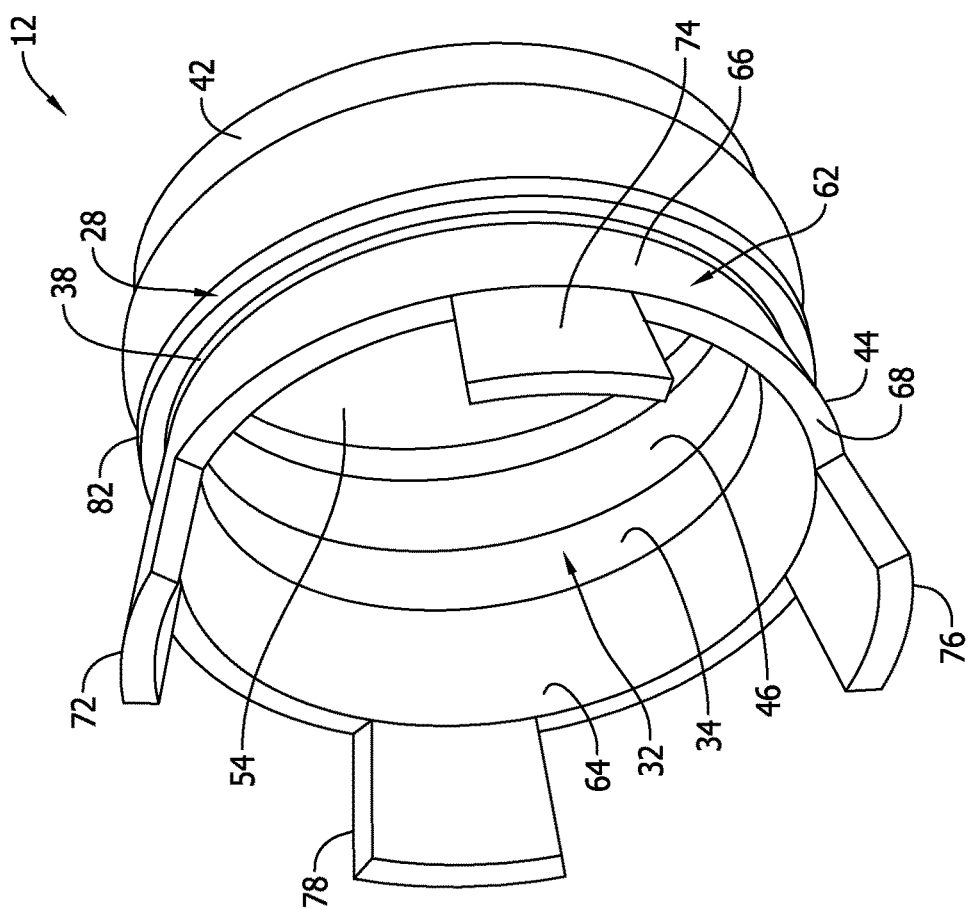
FIG. 2 is a representation of a perspective view of the cap from the open end or outward end of the cap.
Figure 1:
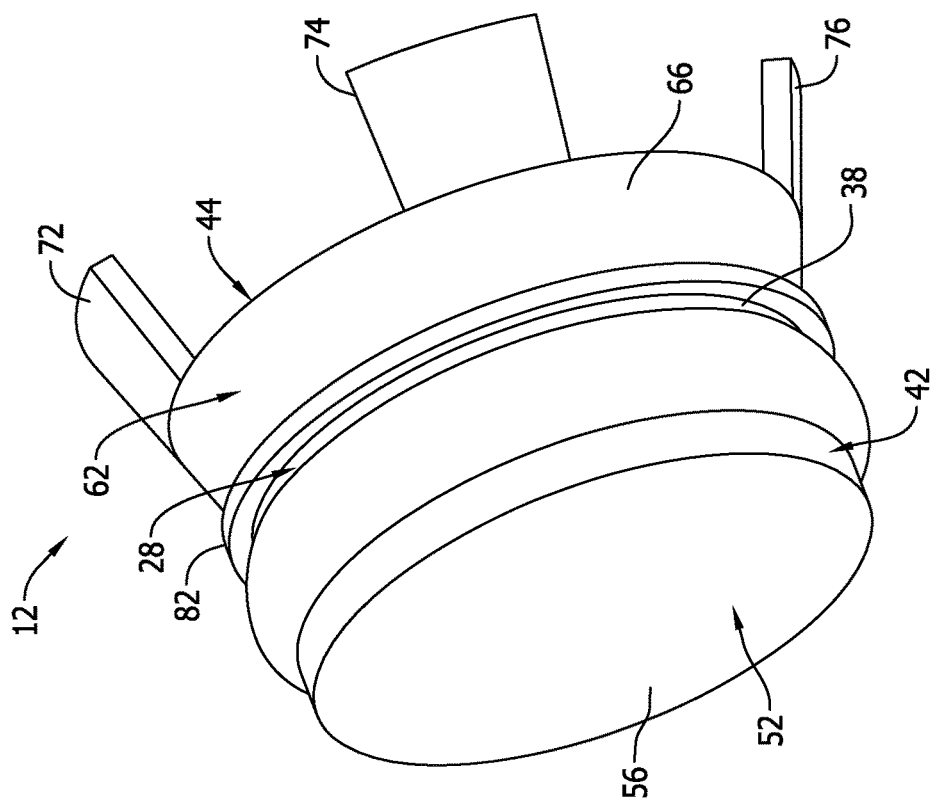
FIG. 1 is a representation of a perspective view of the cap from the closed end or inward end of the cap.
Figure 3:
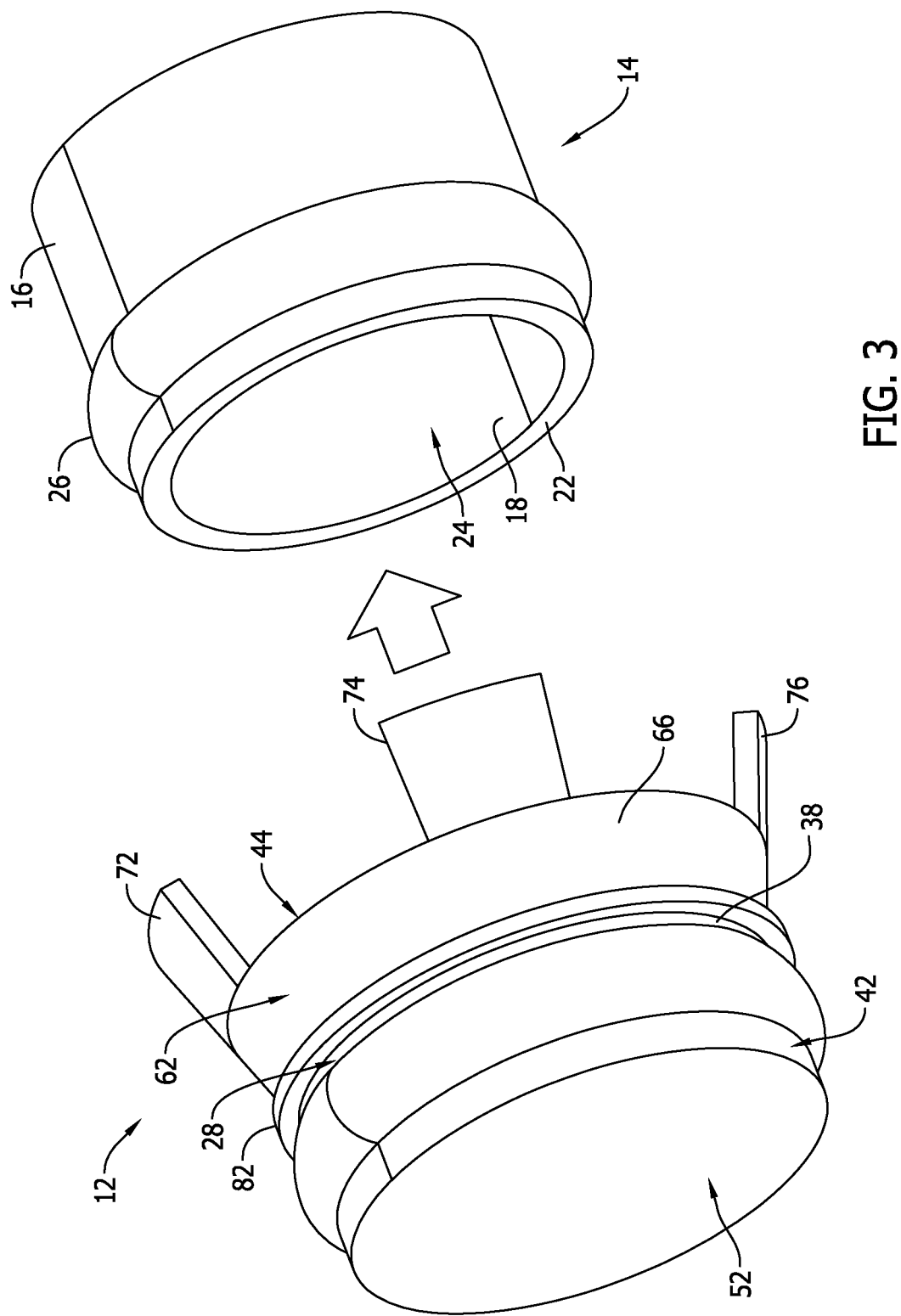
FIG. 3 is a representation of a perspective view of the cap of FIG. 1 positioned adjacent an open end of a duct tube.

In one exemplary embodiment, a cap 12 of this disclosure is represented in perspective views in FIGS. 1-3. An open end of a duct tube 14 to which the cap 12 attaches is also represented in a perspective view in FIG. 3. The cap 12 has a one-piece construction and is integrally formed as a single piece of material. The cap 12 is constructed from a flexible, resilient material such as silicone, rubber, vinyl or other equivalent material. The one-piece construction of the cap 12 and its ability to be integrally formed or molded as a single piece of material reduces the cost of producing the cap 12. The one-piece construction of the cap 12 also reduces the time required to manually position the cap on the open end of the duct tube 14 such as that represented in FIG. 3, and securing the cap 12 on the open end of the duct tube 14.

Only the open end portion of the duct tube 14 is represented in FIG. 3. It should be understood that a typical duct tube will have a length substantially longer than that represented in FIG. 3, and that FIG. 3 only represents a portion of the open end of the duct tube 14. As represented in FIG. 3, the portion of the open end of the duct tube 14 has a cylindrical exterior surface 16 and a cylindrical interior surface 18. An annular end wall 22 extends around the opening 24 into the interior of the duct tube 14. A bead 26 having an annular configuration extends around the exterior surface 16 of the duct tube 14 adjacent the annular end wall 22 of the duct tube 14. The bead 26 has a rounded, convex configuration in cross-section, which defines an outer diameter. The bead 26 is dimensioned and configured to engage in an annular groove inside the cap 12 when the cap 12 is attached and/or positioned over the open end of the duct tube 14, and thereby retain the cap 12 on the open end of the duct tube 14, as will be explained.

The cap 12 has a side wall 28 with a cylindrical configuration. The side wall 28 extends around a hollow interior volume 32 of the side wall and of the cap 12. The side wall 28 has an interior surface 34. The interior surface 34 also has a cylindrical configuration that extends around the hollow interior volume 32 of the side wall 28 and the cap 12. As represented in FIG. 4, the cylindrical configuration of the interior surface 34 of the side wall 28 has a center axis 36 that defines mutually perpendicular axial and radial directions relative to the cap 12. The side wall 28 has an exterior surface 38. The exterior surface 38 also has a cylindrical configuration that extends around the center axis 36. The side wall 28 has an axial length that extends between an inward end or a closed end 42 of the side wall 28 and an opposite outward end or open end 44 of the side wall 28.

As represented in FIGS. 2 and 4, a groove 46 is formed in the interior surface 34 of the side wall 28, and is disposed at an inward end of the side wall. The groove 46 has an annular configuration and extends completely around the interior surface 34 of the side wall 28 and completely around the hollow interior volume 32 of the side wall 28. The groove 46 also has a rounded concave cross-section configuration that is dimensioned to have a diameter corresponding to the outer diameter of the bead 26, and configured to receive the bead 26 on the open end of the duct tube 14 when the duct tube is moved into the cap 12 (or when the cap 12 is positioned on the duct tube 14). The receipt of the bead 26 in the groove 46 secures the cap 12 on the open end of the duct tube 14.

An end wall 52 is connected to the inward end or closed end 42 of the side wall 28. The end wall 52 has a circular configuration with a circular interior surface 54 and an opposite, circular exterior surface 56. The circular configuration of the end wall 52 extends across the cylindrical configuration of the side wall 28 and extends across the hollow interior volume 32 of the side wall 28 and the cap 12. The exterior surface 56 of the end wall 52 extends entirely across the side wall 28 and intersects the exterior surface 38 of the side wall 28. The interior surface 54 of the end wall 52 is positioned in the interior volume 32 of the side wall 28 and acts as an abutment surface that engages with the annular end wall 22 of the duct tube 14 when the open end of the duct tube 14 is moved into the cap 12 to properly position the bead 26 on the open end of the duct tube 14 in the groove 46 in the interior surface 34 of the side wall 28.

The side wall 28 has a conical section 62. The conical section 62 has a tapered cylindrical configuration. The conical section 62 is at the outward end or at the open end 44 of the side wall 28 and opposite the end wall 52. The conical section 62 has an interior surface 64 with a cylindrical and conical configuration that extends axially and radially outwardly from the interior surface 34 of the side wall 28. The conical section 62 also has an exterior surface 66 with a conical configuration. The exterior surface 66 of the conical section 62 extends axially and radially outwardly from the exterior surface 38 of the side wall 28.

The interior surface 64 of the conical section 62 is configured to engage with and guide the open end of the duct tube 14 as the open end of the duct tube 14 is moved into the conical section 62 and is moved further into the hollow interior volume 32 of the side wall 28 by the cap 12 being positioned over the open end of the duct tube 14. The conical section 62 extends axially and radially from the side wall 28 to an end surface 68 of the conical section 62 at the outward end or open end 44 of the side wall 28. The end surface 68 has an annular configuration that extends around the conical section 62 of the side wall and around the outward end or the open end 44 of the side wall 28.

A plurality of pull tabs 72, 74, 76, 78 project axially and radially outwardly from the conical section 62 of the side wall 28. As represented in FIGS. 1-3, the plurality of pull tabs 72, 74, 76, 78 project axially and radially outwardly from the end surface 68 of the conical section 62 and the outward end or open end 44 of the side wall 28. The plurality of pull tabs 72, 74, 76, 78 include at least a first pull tab 72 and a second pull tab 76 that are positioned on radially opposite sides of the center axis 36. The plurality of pull tabs 72, 74, 76, 78 are configured to be manually gripped by a user of the cap 12 and pulled when installing the cap 12 over the bead 26 on the open end of the duct tube 14.

A rib 82 extends around the exterior surface 38 of the side wall 28. The rib 82 has an annular configuration that extends around the exterior surface of the side wall 28. The rib 82 is axially positioned on the exterior surface 38 of the side wall 28 between the conical section 62 of the side wall 28 and the groove 46 in the interior surface 34 of the side wall 28. The rib 82 reinforces the side wall 28 and resists the bead 26 on the open end of the duct tube 14 from being pulled out of the groove 46 and the interior surface 34 of the side wall 28 when the cap 12 is subjected to pressure at the open end of the duct tube 14.

The side wall 28, the end wall 52, the conical section 62, the plurality of pull tabs 72, 74, 76, 78 and the rib 82 are all integrally formed as a single piece of material. The material is a flexible, resilient material such as silicone rubber, vinyl, or other equivalent material. The resilient material makes the side wall 28 resilient. The side wall 28 being resilient enables the cylindrical configuration of the interior surface 34 of the side wall and the groove 46 formed in the interior surface 34 to expand radially outwardly as the bead 26 around the open end of the duct tube 14 is moved through the conical section 62 of the side wall 28 and into the interior surface 34 of the side wall 28 as the cap 12 is positioned on the open end of the duct tube 14. The resiliency of the side wall 28 permits the passage of the bead 26 around the open end of the duct tube 14 into the cylindrical configuration of the interior surface 34 of the side wall 28 and into the groove 46 as the cap 12 is positioned over the open end of the duct tube 14 and the pull tabs 72, 74, 76, 78 are manually gripped and pulled, pulling the cap 12 onto the open end of the duct tube 14. The pull tabs 72, 74, 76, 78 are manually gripped and pulled, pulling the cap 12 on the open end of the duct tube 14 until the open end of the duct tube 14 is moved entirely into the hollow interior volume 32 of the side wall 28 and the duct tube annular end wall 22 engages against the interior surface 54 of the end wall 52. This positions the bead 26 on the open end of the duct tube 14 in the groove 46 where the groove 46 retains the bead 26 around the open end of the duct tube 14 and thereby retains the cap 12 on the duct tube 14.

Figure 6:
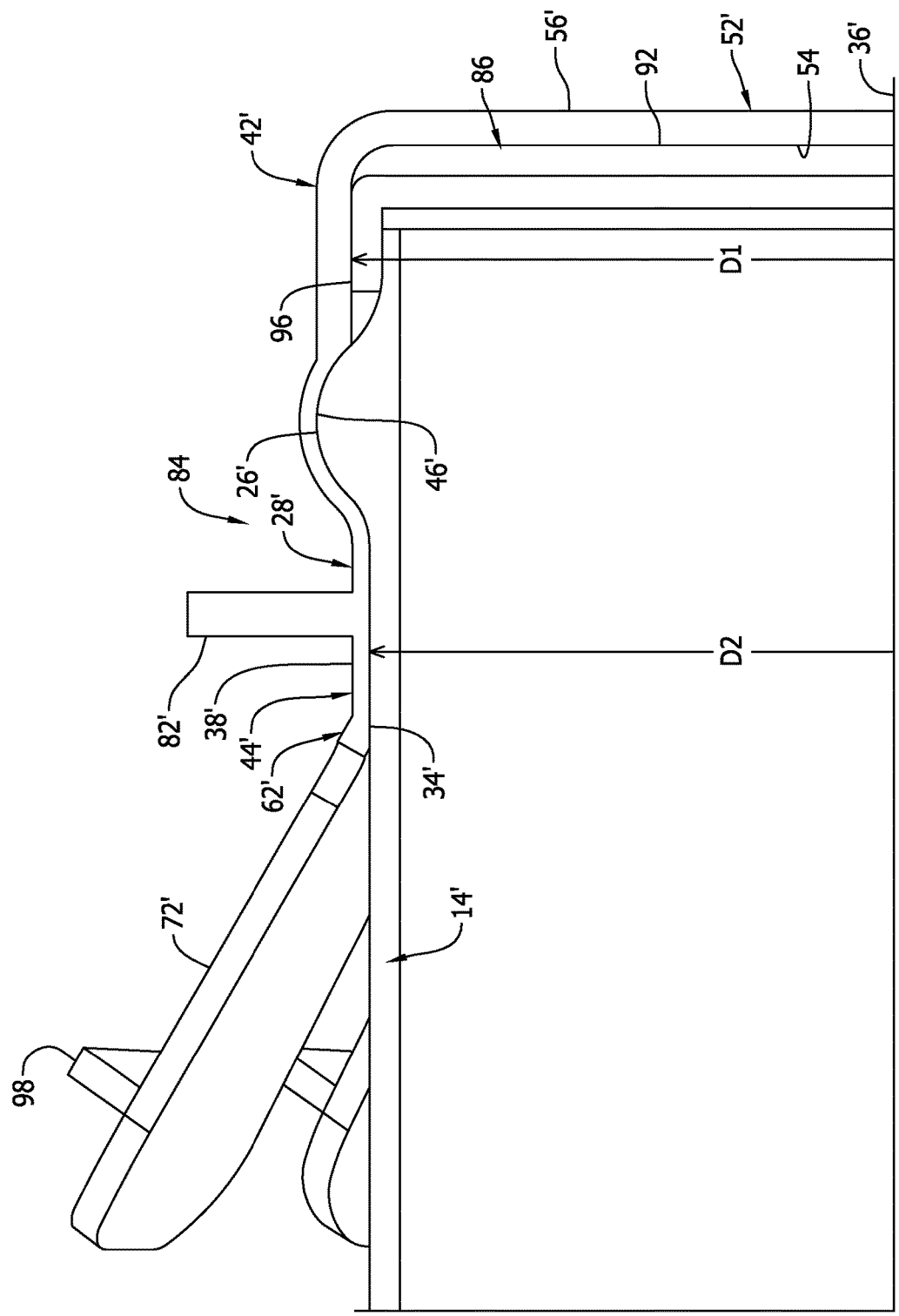
FIG. 6 is a representation of an enlarged, partial view of the cap of FIG. 5.

FIGS. 5 and 6 are representations of a side elevation, cross-section view of a further example of the cap 84 positioned on an orifice 86 over an open end of a duct tube 14'. Apart from the presence of the orifice 86, the construction of the cap 84 represented in FIGS. 5 and 6 and the open end of the duct tube 14 represented in FIGS. 5 and 6 are basically the same as the representations of the cap 12 in FIGS. 1-4 and the representation of the open end of the duct tube 14 in FIG. 3. The reference numbers used to label the features of the cap 12 in FIGS. 1-4 and the open end of the duct tube 14 used in FIG. 3 are used in FIGS. 5 and 6, with the reference numbers being followed by a prime (').

The orifice 86 represented in FIGS. 5 and 6 is positioned over the open end of the duct tube 14' to adjust the flow rate of conditioned air emitted from the open end of the duct tube 14'. The orifice 86 has a wall 92 with a circular configuration that is dimensioned to extend entirely across the open end of the duct tube 14'. The orifice wall 92 is constructed like a sieve with a plurality of openings 94 through the orifice wall that control the rate of fluid flow through the orifice 86. A peripheral band 96 extends around the outer periphery of the orifice wall 92. The peripheral band 96 engages around the exterior surface 16' of the open end of the duct tube 14' and secures the orifice 86 to the open end of the duct tube 14'.

To accommodate the orifice 86 on the open end of the duct tube 14', the cap 84 of FIGS. 5 and 6 has an interior diameter dimension D1 of the interior surface 34' of the side wall 28' adjacent the side wall closed end 42' that is larger than the interior diameter dimension D2 of the interior surface 34' of the side wall 28' adjacent the open end 44' of the side wall. The larger interior diameter dimension D1 of the interior surface 34' forms a "pocket" for the orifice 86 in the interior surface 34' so that the cap 84 does not need to "stretch" over the orifice 86. The differences of the interior diameter dimension of the interior surface 34' of the side wall 28' of the cap 84 represented in FIGS. 5 and 6 are basically the only differences in the construction of the interior of the cap 84 represented in FIGS. 5 and 6 and the cap 12 represented in FIGS. 1-4.

There are differences in the construction of the exterior of the cap 84 represented in FIGS. 5 and 6 and the cap 12 represented in FIGS. 1-4. On the cap 84 represented in FIGS. 5 and 6, the pull tabs 72' have finger grips 98 that project radially outwardly from the pull tabs 72'. The finger grips 98 make it easier to manually grip the pull tabs 72' when pulling the cap 84 onto the open end of a duct tube 14'. Each of the pull tabs 72' is provided with a finger grip 98 that projects radially from the pull tabs 72'.

As various modifications could be made in the construction of the cap and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A cap for closing a duct tube having a bead around an end of the duct tube, the cap comprising:
   a side wall having a cylindrical configuration, the side wall having an interior surface with a cylindrical configuration that extends around a hollow interior volume of the side wall;
   the side wall having a conical section, the conical section having a conical interior surface that extends outwardly from the interior surface of the side wall, the conical interior surface being configured to guide an end of a duct tube into the hollow interior volume of the side wall;
   a groove in the interior surface of the side wall, the groove having an annular configuration that is configured to receive a bead around an end of a duct tube inserted through the conical section of the side wall and into the hollow interior volume of the side wall;
   a plurality of pull tabs arranged around the conical section of the side wall; and a respective finger grip projecting outwardly from each of the plurality of pull tabs.

2. The cap of claim 1, further comprising:
the interior surface of the side wall having an interior diameter dimension;
the interior diameter dimension of the side wall being smaller than an exterior diameter dimension of the bead around the end of the duct tube; and,
the side wall being resilient enabling the cylindrical configuration of the interior surface of the side wall to expand as the bead around the end of the duct tube is inserted through the conical section of the side wall and into the interior surface of the side wall to retain the bead around the end of the duct tube in the interior surface of the side wall.

3. The cap of claim 1, further comprising:
the side wall being resilient enabling the cylindrical configuration of the interior surface of the side wall to deflect radially outwardly to permit passage of the bead around the end of the duct tube into the cylindrical configuration of the interior surface of the side wall and into the groove, whereby the groove retains the bead around the end of the duct tube to thereby retain the cap on the duct tube.

4. The cap of claim 1, wherein:
the plurality of pull tabs project outwardly from the conical section of the side wall, the plurality of pull tabs being configured to be manually gripped by a user of the cap and pulled when installing the cap on the bead around the end of the duct tube.

5. The cap of claim 1, wherein:
the side wall, the conical section of the side wall and the plurality of pull tabs are integrally formed as a single piece of material.

6. The cap of claim 1, further comprising:
a rib on the side wall, the rib having an annular configuration extending around the side wall; and,
the rib being positioned on the side wall between the conical section of the side wall and the groove.

7. The cap of claim 1, further comprising:
an end wall adjacent the side wall at an opposite end of the side wall from the conical section of the side wall; and,
a rib around the side wall, the rib being positioned between the conical section of the side wall and the end wall.

8. The cap of claim 7, further comprising:
the interior surface of the side wall having a first interior diameter dimension adjacent the conical section; and,
the interior surface of the side wall having a second interior diameter dimension adjacent the end wall, the second interior diameter dimension being larger than the first interior diameter dimension.

9. A cap for closing a duct tube, the cap comprising:
a side wall, the side wall having a cylindrical configuration that extends around a hollow interior volume of the cap, the cylindrical configuration of the side wall having a center axis that defines mutually perpendicular axial and radial directions relative to the cap, the side wall having an axial length that extends between an inward, closed end of the side wall and an outward, open end of the side wall;
an end wall connected to the inward, closed end of the side wall, the end wall having a circular configuration, the end wall extending across the cylindrical configuration of the side wall and across the hollow interior volume of the cap;
an end surface on the outward, open end of the side wall, the end surface having an annular configuration that extends around the side wall and around the hollow interior volume of the cap;
a pull tab on the outward, open end of the side wall, the pull tab projecting from the end surface; and
a finger grip projecting outwardly from the pull tab.

10. The cap of claim 9, further comprising:
the side wall, the end wall, the end surface and the pull tab are all integrally formed as a single piece of material.

11. The cap of claim 9, further comprising: the pull tab being a first pull tab;
a second pull tab on the outward, open end of the side wall, the second pull tab projecting from the end surface; and,
the first pull tab and the second pull tab being positioned on radially opposite sides of the center axis.

12. The cap of claim 9, further comprising:
the pull tab being one pull tab of a plurality of pull tabs on the outward, open end of the side wall, the plurality of pull tabs projecting from the end surface, the plurality of pull tabs being spatially arranged around the center axis.

13. The cap of claim 9, further comprising:
a rib on the side wall, the rib having an annular configuration extending around the side wall.

14. The cap of claim 13, further comprising:
the side wall having an interior surface that extends around the hollow interior volume; and,
a groove in the interior surface, the groove having an annular configuration that extends around the hollow interior volume, the groove being positioned axially between the rib and the end wall.

15. The cap of claim 14, further comprising:
the interior surface having a first interior diameter dimension adjacent the end surface;
the interior surface having a second interior diameter dimension adjacent the end wall; and,
the second interior diameter dimension being larger than the first interior diameter dimension.

16. The cap of claim 9, further comprising:
the side wall having a conical section, the conical section of the side wall extending radially away from the center axis as the conical section of the side wall extends axially away from the end wall.

17. The cap of claim 16, further comprising:
the pull tab being a first pull tab, the first pull tab projecting from the conical section of the side wall;
a second pull tab on the conical section of the side wall, the second pull tab projecting from the conical section of the side wall; and,
the first pull tab and the second pull tab being positioned on radially opposite sides of the center axis.

18. A method of capping off an open end of a duct tube, the method comprising:
positioning a hollow interior volume inside a side wall of a cap adjacent an open end of the duct tube; and,
pulling pull tabs projecting from the side wall of the cap toward and over the open end of the duct tube;
providing a respective finger grip to project outwardly from each of the pull tabs; and
pulling the side wall of the cap onto the open end of the duct tube.

19. The method of claim 18, further comprising:
pulling a conical section of the side wall of the cap over the open end of the duct tube prior to pulling the side wall of the cap onto the open end of the duct tube.

\* \* \* \* \*